Jan. 19, 1943.   S. L. SUNDSTROM   2,308,791
LIQUID LEVEL GAUGE
Filed Aug. 21, 1939
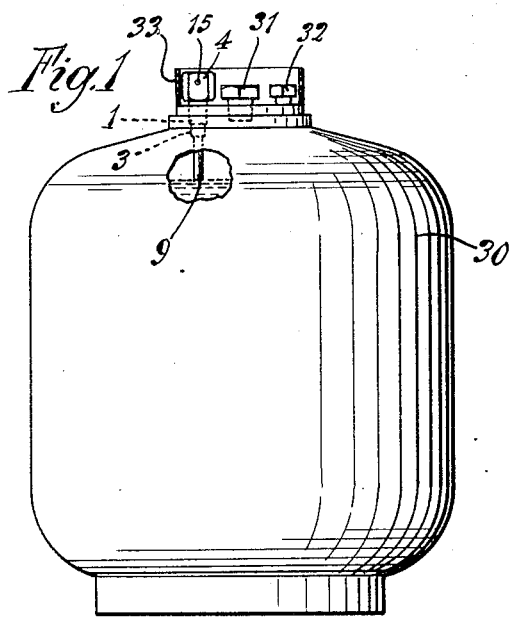
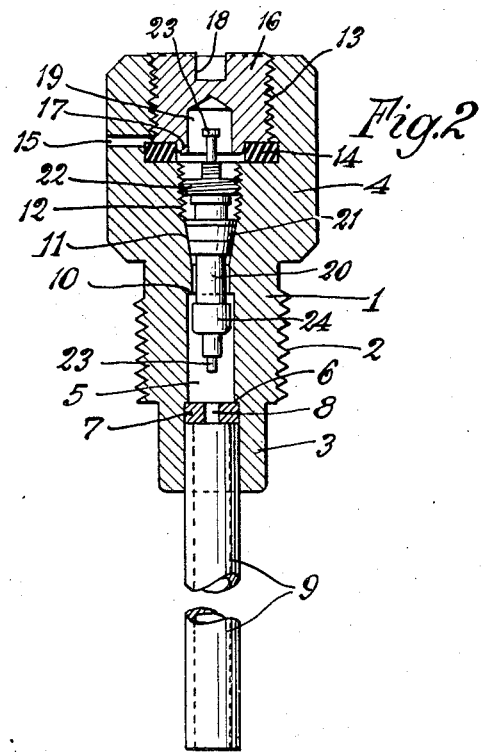
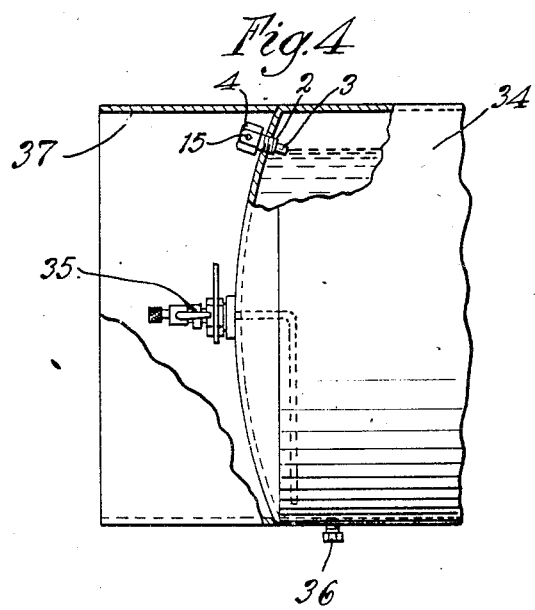
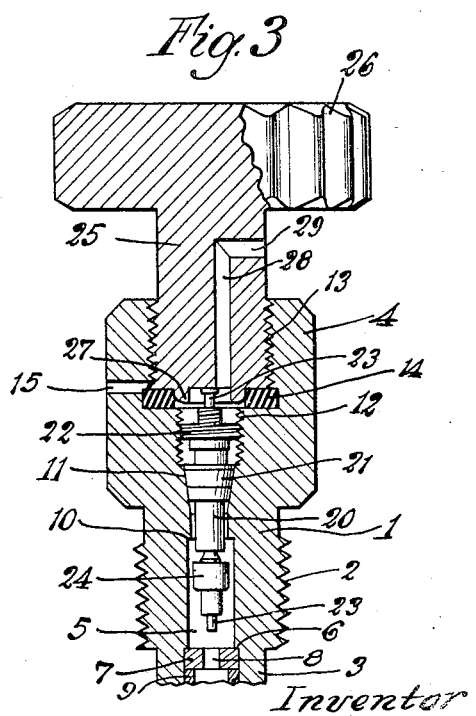
Inventor
Savin L. Sundstrom
by Parker + Carter
Attorneys.

Patented Jan. 19, 1943

2,308,791

UNITED STATES PATENT OFFICE 2,308,791

LIQUID LEVEL GAUGE

Savin L. Sundstrom, Chicago, Ill., assignor to The Bastian-Blessing Company, Chicago, Ill., a corporation of Illinois Application August 21, 1939, Serial No. 291,178

12 Claims. (Cl. 73—297)

This invention relates to a gauge and particularly to a gauge for use in connection with tanks in which liquid is stored. It has for one object to provide a gauge and plug assembly which may be inserted in a suitable opening in a tank and which can be manipulated to indicate the depth of liquid within the tank.

Another object is to provide in connection with such a gauge assembly, means for positively closing the opening.

A further object is to provide means for venting pressure from the gauge plug or housing before the closing is fully removed.

A still further object is to provide a removable passage forming member for use during the gauging operation.

Other objects will appear throughout the specification and claims.

The invention is illustrated more or less diagrammatically in the accompanying drawing, wherein:

Figure 1 is a side elevation of one type of tank to which the gauge may be applied.

Figure 2 is a longitudinal sectional view with some parts in elevation, illustrating the gauge plug and assembly in the closed position.

Figure 3 is a similar view showing the parts in the gauging position.

Figure 4 is a side elevation with parts broken away and parts in section showing a modified form of tank to which the gauge may be applied.

Like parts are designated by like characters throughout.

The gauging assembly includes a hollow housing 1, which has a threaded portion 2 and may be reduced as at 3 if desired. It is preferably enlarged as at 4, and is given an annular cross section to assist in screwing it into and out of place. As stated the member is hollow and it is provided with a bore 5. This bore is enlarged adjacent the inner end of the housing to provide a shoulder 6, against which a restricter washer 7 is seated. This washer is perforated to provide a restricter opening 8. For one installation a tube 9 may be seated in the bore 5 and will normally abut against the washer 7. Above the shoulder 6 the passage 5 may be restricted to provide a second shoulder 10. A tapered seat 11 is formed above this shoulder. The bore is enlarged and threaded as at 12 above the tapered seat. It is further enlarged and interiorly threaded as at 13. A washer 14 is positioned in the enlargement 13. An opening 15 may be formed in the housing and extends from the outside into the enlargement 13 of the bore 5.

When the gauge is not in use a seal plug 16 is seated in the threaded enlargement 13 of the bore 5 as shown in Figure 2. This plug bears against the washer 14. It is preferably provided with an enlargement 17, which extends into the perforation in the washer 14 to make a better seal. The plug may also have a cross cut 18 in its upper end to receive a tool by means of which it is moved into and out of place. On its inner face the plug is provided with a hollow 19.

A valve assembly is removably seated within the housing 1 and primarily within the enlarged portion 4. This valve assembly in the form here shown is of the old known "Schrader" type. It comprises a barrel 20, a tapered portion 21, which seats in the seat 11 and a threaded portion 22 which engages the threading in the enlargement 12 of the bore 5. These parts of the assembly remain fixed during operation. A stem 23 extends through the barrel, projecting at the upper and lower ends. A valve portion 24 is mounted on the stem 23 and may set against the barrel 20 to close it. A spring, not here shown, is positioned within the barrel and holds the valve seated, raising the stem when free to do so. The parts are shown with the valve closed in Figure 2.

When the valve is to be opened to permit gauging it is moved to the open position shown in Figure 3. As there shown the stem 23 has been depressed carrying the valve part 24 downwardly and out of contact with the barrel 20, thus opening the lower end of the barrel and permitting flow through it. To accomplish the opening shown in Figure 3, the seal plug 16 is removed and the gauge plug is inserted. This plug comprises a portion 25 which may be enlarged and provided with a fluted handle portion 26. The portion 25 is of the same size and shape as the plug 16 and similarly engages the threads 13. It may also have a downward directed annular enlargement or land 27 corresponding to the enlargement 17 of the plug 16. In this instance, however, the land enters the perforation in the washer 14 at substantially the same time that the plug engages the valve part 23. The gauge plug 25 however, has no depression corresponding to that of the seal plug and consequently when the gauge plug is moved into place it strikes the upper end of the part 23 and depresses it to open the valve. The gauge plug has a longitudinal passage 28 formed in it from which a branch 29 leads to the exterior.

As shown in Figure 1, the gauge assembly is seated in a suitable opening in a tank 30. Other plugs 31 and 32 indicate other connections. A wall-like member 33, preferably surrounds the various plugs or connections and protects them against danger when in transit.

In Figure 4 the gauging assembly, slightly modified, is shown applied to a tank 34 of different type from the tank 30. Since the assembly lies in a relatively horizontal position the tube 9 is omitted and the end 3 of the housing 1 projects downwardly into the tank. Except for this change, the gauge assembly is exactly as illustrated in Figures 1, 2 and 3. A service connection and gauge are indicated generally at 35 and a plug 36 is also indicated. A projection 37 extends from the tank and surrounds the various connections to protect them in transit.

Although there is shown an operative form of the device, it will be understood that many changes in the form, shape and arrangement of parts might be made without departing from the spirit of the invention; and it is wished that this showing be taken as, in a sense, diagrammatic. In particular, while a "Schrader" valve has been described, the invention is not to be limited to this type of valve nor to any other type of valve. The "Schrader" valve is available in the general market and is suitable and convenient for use. However, any valve which would normally remain closed but which is provided with means for positively opening it to permit the operation shown in Figure 3 might be substituted for the well-known "Schrader" type of valve.

The use and operation of this invention are as follows:

The device of this invention may be applied to many different containers. It is not limited in its application to any particular type of container although it is particularly useful in connection with containers in which liquid is stored under pressure when such use is in connection with the storage of liquefied hydro-carbon gases.

As shown, the gauge assembly is mounted in Figure 1 in the upper part of the tank, and in Figure 4 in the end of the tank. It might, also, have been mounted in the upper part of a tank such as that shown in Figure 4.

The gauge assembly, as shown in Figure 2, is mounted in a tank by being screwed into a suitably threaded opening which may be positioned in any desired part of the tank. Ordinarily, the gauge is closed except during filling. The parts will occupy the position shown in Figure 2, and the seal plug 16 will be screwed into position. As there shown, it closes the passage in which the valve is positioned and should the valve leak or even fail entirely it prevents discharge of the fluid from the tank.

Should the valve have leaked or failed, fluid under pressure will have passed it and will fill the upper part of the bore 5, and unless some provision were made, the operator would not know that this had occurred. The plug 16 would be subject to pressure, and upon being screwed out, this pressure might drive the plug forcibly outward to injure the operator or cause other damage. To prevent this, the hole or perforation 15 is formed. When the plug 16 is fully seated, this hole is closed. When the plug is backed off and before it is fully removed, the opening 15 will be uncovered and if anything has happened to permit fluid under pressure to enter the space above the valve, this fluid under pressure will be discharged through the opening 15 and the operator will know at once the conditions prevailing within the housing 4. Whatever the conditions, the plug 16 will be removed. If a new valve is necessary, it will be put in place.

When filling of the tank is to commence, the plug 16 is removed and the gauge plug 25 is inserted. This plug closes the opening 15 but opens the valve by depressing the stem 23 and opens a passage from the interior of the valve housing 4 through the passage 28, 29 to the outside air. When, under these conditions, fluid is discharged into the tank through another connection, pressure will escape through the gauge housing and through the plug 25. Until the level of liquid reaches the bottom of the tube 9, however, no liquid will escape. When the liquid level reaches the tube, then liquid is discharged through the passage 28, 29, and the operator is informed by this discharge that the tank is as full as it should be. He, then, stops further filling. He removes the plug 25 and the valve closes because the stem 23 is no longer positively held open against the resistance of the spring in the valve assembly which tends to close the valve. After the removal of the plug 25, the sealing plug 16 is inserted and screwed home, and the tank is ready for removal or use.

The operation of the form of the valve shown in Figure 4 is substantially the same as that just described. If the gauge assembly were to be inserted in the upper part of the tank 34, it would preferably be in exactly the form shown in Figures 1 and 2. If it is to be inserted in the end of the tank, however, the tube 9 is relatively unnecessary, and while it might be left in position it is generally convenient to remove it, and the gauge assembly is, thus, put in place as shown in Figure 4. It differs only from the form shown in Figures 1 and 2 by the removal of the tube 9, and it is used and it functions in the manner described above.

I claim:

1. In combination in a valve assembly, a hollow housing having a main fluid passage therethrough, a normally closed out flow check valve positioned in said passage and adapted to close said passage, said passage having an entrance and a discharge opening and a plug having a bleed opening therethrough adapted to be placed in communication with said discharge opening, a second passage formed in the wall of said housing communicating with the interior thereof and positioned between said discharge opening and said valve, said plug, when seated, placing said bleed in communication with the discharge opening of said main passage and closing, also, said second passage, said plug, when seated, opening said valve and when in one position of adjustment, closing only said main discharge opening.

2. A liquid level gauging assembly having a plug and comprising a hollow housing, said housing provided with a main passage of varying diameter, said passage being enlarged adjacent one end, a packing washer seated in said enlargement, a second passage extending from the exterior of said housing to said enlargement for venting pressures accumulating at the washer, a valve positioned in said main passage, said plug removably positioned in said enlargement to close both of said passages and open the second passageway before the main passageway when removed, said plug having on its inner face a depression, a portion of said valve extending into said depression, said plug, when seated, contacting said washer.

3. A liquid level gauging assembly including a plug and comprising a hollow housing, said housing provided with a main passage, said passage being enlarged adjacent one end, a packing washer seated in said enlargement, a second passage extending from the exterior of said housing to said enlargement, a Shrader type valve positioned in said main passage, said plug removably positioned in said enlargement to close said main passage, said plug having on its inner face a depression, a portion of said valve extending into said depression, there being a shoulder formed in said main passage away from said enlargement, a restrictor washer seated against said shoulder and a tube positioned against said restrictor washer and extending outside of said housing, said plug, when seated, contacting said packing washer.

4. A liquid level gauging assembly including a plug and dip tube comprising a hollow housing, said housing provided with a main passage of varying diameter, said passage being enlarged adjacent one end, an annular packing washer seated in said enlargement, a second passage extending from the exterior of said housing to said enlargement, a valve assembly positioned in said main passage, said plug removably positioned in said enlargement to close both of said passages, said plug having on its inner face a depression, a portion of said valve assembly extending into said depression, there being an annular land about said depression of substantially the same exterior diameter as the interior diameter of said packing washer, there being a shoulder formed in said main passage away from said enlargement, a restrictor washer seated against said shoulder and said tube positioned against said restrictor washer and extending outside of said housing.

5. A liquid level gauge fitting adapted to receive alternatively a sealing plug and a valve control plug, said fitting comprising a hollow housing having a main fluid passage therethrough, a valve assembly positioned in said passage and adapted to close said passage, said passage having an entrance and a discharge opening and a plug for removably closing said discharge opening, said valve having an axially displaceable actuating member extending into said discharge opening, a second passage formed in the wall of said housing communicating with the interior thereof and positioned between said discharge opening and said valve member, said plug having a recessed end which, when seated, closes the discharge opening of said main passage without contacting said valve member and closing, also, said second passage, said plug, in one position of adjustment, closing only said main discharge opening.

6. A valve assembly for use with liquefied petroleum gases comprising a housing having a main fluid passage therethrough, an automatically closing check valve positioned in said passage and adapted to close said passage, said passage having an entrance and a discharge opening, a resilient washer supported by the housing in the passage, a removable plug cooperating with the washer for closing said discharge opening, means for restricting the flow of fluid through said passage including a fixed orifice, a second passage formed in the wall of said housing communicating with the interior thereof outwardly of said restricting means to bleed pressure from the housing beyond the valve and positioned between said discharge opening and said valve, said plug when seated closing the discharge opening of said main passage and closing also said second passage to prevent escape of fluid passing the check valve when closed.

7. A valve assembly for use with liquefied petroleum gases comprising a hollow housing having a main fluid passage therethrough provided with an entrance and a discharge opening, a seat in said passage between the entrance and said opening, a check valve, means for automatically closing said valve against the flow of fluid from said entrance to said discharge opening, a plug removably received in said discharge opening for closing same, an element in said entrance having a flow restricting opening therethrough, a second passage formed in the wall of said housing and communicating with the interior thereof between said discharge opening and said valve to bleed pressure from the housing beyond the valve, said plug when seated closing the discharge opening of said main passage and closing also said second passage to prevent escape of fluid passing the check valve when closed, said plug, in one position of adjustment, closing only said main discharge opening.

8. A liquid level gauge fitting adapted to receive alternatively a sealing element and a valve control element, said fitting comprising a housing having a main fluid passage therethrough, a seat in said passageway engaged by said elements, an automatic valve positioned in said passage and adapted to close said passage, said passage having an entrance and a discharge opening in which said elements are removably received for closing said discharge opening, means for restricting the flow of fluid through said passage, a vent passage formed in the wall of said housing communicating with the first passage between said discharge opening and said valve, said sealing element, when seated against said seat, closing the discharge opening of said main passage and closing said vent passage from said main passage, and said valve control element when seated opening said valve.

9. A liquid level gauging assembly comprising a hollow housing, a plug, said housing having a main passageway provided with an enlargement adapted to receive the plug at its outer end, a shoulder at the bottom of said enlargement, a valve in said passage inwardly of the shoulder and having a portion extending into said enlargement beyond the shoulder, a packing washer seated against said shoulder in said enlargement and disposed around said valve portion, a second passage extending from the exterior of the housing to said enlargement in communication therewith outwardly of the packing washer, said plug being removably positioned in said main passage to close communication between the second passage and that portion of the main passage located inwardly of the shoulder, and means upon said plug accommodating the valve extending portion including a recess clearing the extending portion and an enlargement providing a wall extending into the perforation of the washer when the plug is in seated position on the washer.

10. A liquid level gauging assembly comprising a housing provided with a passage therethrough enlarged at one end, a shoulder at the bottom of the enlarged portion, a packing washer seated in said enlargement, an automatically closing valve assembly positioned in the passage inwardly of the washer and having a portion extending into said enlarged portion, a plug removably received in said enlargement to close said passage and engaging said extending portion to open the valve when the plug is seated, said plug having cut away portions at its end one of said portions engaging the washer in sealed relation and another portion adapted to permit escape through it to permit the escape of fluid through it from said valve, and conduit means connecting said other cut away portion to the atmosphere when the plug opens the valve.

11. A liquid level gauging assembly including a plug, comprising a housing provided with a main passage enlarged adjacent one end thereof and having a shoulder at the inner end of the enlargement, a second passage extending from the exterior of said housing to said enlargement, a washer seated on said shoulder and having a perforation therein, a valve positioned in the main passage, said plug being removably received in said enlargement to close both of said passages, said plug having on its inner face a depression surrounded by a land, a portion of the valve extending within said depression and engaged by said plug during the latter portion of the movement of the plug into sealed relation with said washer, said land entering said perforation substantially at the time that the plug engages said valve extending portion.

12. A fitting for a fixed filling level indicator comprising a hollow housing, said housing being provided with a main passage enlarged at one end, an annular packing washer seated in said enlargement, a second passage extending from the exterior of said housing to said enlargement, a portion of said main passage of less diameter than said enlargement being threaded, a Schrader type valve positioned in said main passage and threaded into said threaded portion, a plug removably received in said enlargement and cooperating with said washer to close said main passage, said plug having on its inner face a depression and a passage extending therefrom through said plug, a portion of said valve extending into said depression, and an annular land around said depression having substantially the same exterior diameter as the interior diameter of said packing washer.

SAVIN L. SUNDSTROM.